Figure 1A:
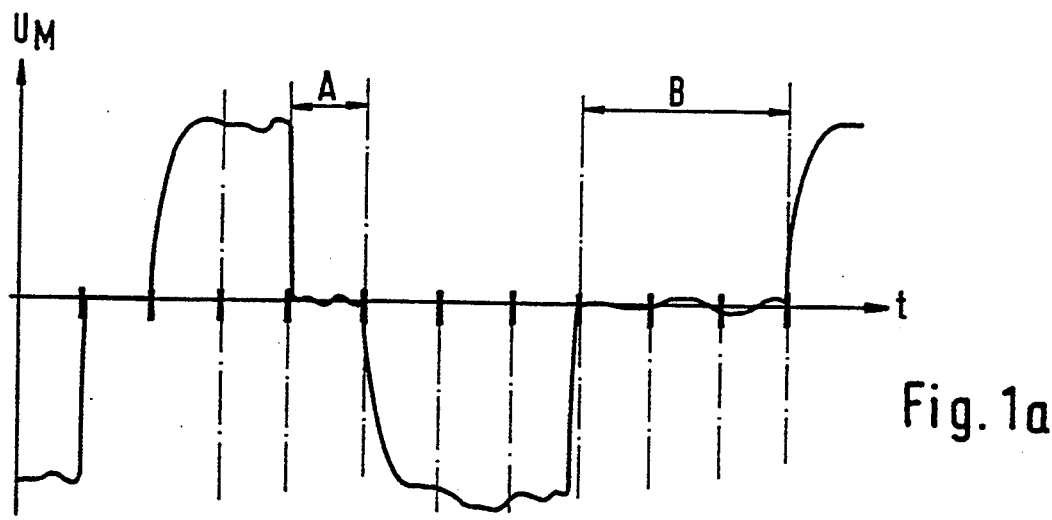

United States Patent [19]

Budmiger

[11] Patent Number: 5,351,554
[45] Date of Patent: Oct. 4, 1994

[54] MAGNETOINDUCTIVE FLOWMETER

[75] Inventor: Thomas Budmiger, Ettingen, Switzerland

[73] Assignee: Endress + Hauser Flowtec AG, Switzerland

[21] Appl. No.: 891,396

[22] Filed: May 29, 1992

[30] Foreign Application Priority Data

Jun. 8, 1991 [EP] European Pat. Off. ........ 91 109405.0

[51] Int. Cl.$^5$ .............................................. G01F 1/60
[52] U.S. Cl. .................................. 73/861.17; 73/861.16
[58] Field of Search ............. 73/861.16, 861.17, 861.11

[56] References Cited

U.S. PATENT DOCUMENTS

| | | | |
|---|---|---|---|
| 3,783,687 | 1/1974 | Mannherz et al. | 73/861.17 |
| 4,210,022 | 7/1980 | Boss . | |
| 4,218,915 | 8/1980 | Torimaru . | |
| 4,339,958 | 7/1982 | Shauger | 73/861.17 |
| 4,410,926 | 10/1983 | Hafner et al. . | |
| 4,676,112 | 6/1987 | Uematsu et al. | 73/861.17 |
| 4,704,908 | 11/1987 | Blatter . | |
| 4,972,722 | 11/1990 | Hansen et al. | 73/861.17 |

FOREIGN PATENT DOCUMENTS 57-28212 2/1982 Japan .

OTHER PUBLICATIONS

Horowitz, P., and W. Hill, The Art of Electronics, Cambridge Univ. Press, Cambridge (1980), pp. 418–419.
Inose et al., "A Telemetering System by Code Modulation", IRE Transactions on Space Electronics and Telemetry, pp. 204–209, Sep. 1962.
Robert et al., "A 16-bit Low-Voltage CMOS A/D Converter", IEEE Journal of Solid-State Circuits, vol. SC-22, No. 2, pp. 157–163, Apr. 1987.
Robert et al., "A Second-Order High-Resolution Incremental A/D Converter with Offset and Charge Injection Compensation", IEEE Journal of Solid-State Circuits, vol. 23, No. 3, pp. 736–741, Jun. 1988.

Primary Examiner—Richard E. Chilcot, Jr.
Assistant Examiner—R. Biegel
Attorney, Agent, or Firm—Barnes & Thornburg

[57] ABSTRACT

To provide highly accurate analog-to-digital conversion which is independent of coil-current fluctuations, this magnetoinductive flowmeter is equipped with a pipe made either of nonferromagnetic metal and insulated inside or of electrically non-conductive material, a coil system for producing a magnetic field whose direction is practically perpendicular to the axis of the pipe and which cuts the pipe, a control circuit for controlling a current flowing through the coil system and a measuring resistor, two electrodes which are mounted opposite each other in the wall of the pipe and whose connecting line is practically perpendicular to the pipe axis and to the direction of the magnetic field, and a measuring circuit having its input connected to the electrodes and containing, between its input and its output, the following subcircuits in the order given: a differential amplifier connected to the electrodes, a summer, an analog-to-digital converter which continuously incorporates a reference voltage in the conversion and to which the voltage across the measuring resistor is applied as said reference voltage, a microprocessor generating a compensation signal for the summer and including a sequencer, and a display unit.

16 Claims, 3 Drawing Sheets

MAGNETOINDUCTIVE FLOWMETER

The present invention consists in a magnetoinductive flowmeter comprising a pipe made either of nonferromagnetic metal and insulated inside or of electrically non-conductive material, a coil system for producing a magnetic field whose direction is practically perpendicular to the axis of the pipe and which cuts the pipe, a control circuit for controlling a current flowing through the coil system and a measuring resistor, two electrodes which are mounted opposite each other in the wall of the pipe and whose connecting line is practically perpendicular to the pipe axis and to the direction of the magnetic field, and a measuring circuit having its input connected to the electrodes and containing, between its input and its output, the following subcircuits in the order given: a differential amplifier connected to the electrodes, a summer, an analog-to-digital converter which continuously incorporates a reference voltage in the conversion and to which the voltage across the measuring resistor is applied as said reference voltage, a microprocessor generating a compensation signal for the summer and including a sequencer, and a display unit.

In the journal "msr", 1988, pages 194 to 196, a magnetoinductive flowmeter, namely a commercially available device of the type DISCOMAG, is described comprising a pipe made either of nonferromagnetic metal and insulated inside or of electrically non-conductive material, a coil system for producing a magnetic field whose direction is practically perpendicular to the axis of the pipe and which cuts the pipe, a control circuit for controlling a current flowing through the coil system and a measuring resistor, two electrodes which are mounted opposite each other in the wall of the pipe and whose connecting line is practically perpendicular to the pipe axis and to the direction of the magnetic field, and a measuring circuit having its input connected to the electrodes and containing, between its input and its output, the following subcircuits in the order given: a differential amplifier connected to the electrodes, a summer, an analog-to-digital converter, a microprocessor generating a compensation signal for the summer and including a sequencer, and a display unit.

The problems underlying the invention are as follows. In the magnetoinductive flowmeter described in the above journal, the analog-to-digital converter is a dual-slope analog-to-digital converter as is commonly used in digital voltmeters, for example. Such analog-to-digital converters incorporate only that reference-voltage value in the conversion which is applied at the beginning of each measurement period. Hence, they base the conversion on a reference-voltage value which is constant during each conversion period. In the prior art magnetoinductive flowmeters, this is the value of the voltage appearing across the measuring resistor. This voltage value is commonly held by means of a sample/hold stage.

Since in the prior art arrangement the coil current is maintained constant by a current regulator, it has so far been held that this single sampling of the reference voltage during each conversion period is sufficient, because the coil current can be assumed to be absolutely constant, so that dual-slope analog-to-digital converters are readily usable. As investigations by the inventor have shown, however, this assumption must be questioned if high-precision magnetoinductive flowmeters have to be implemented. It cannot always be ruled out that the coil current varies during the measurement period due to disturbances in the current regulation. If no regulation is provided, the coil current will vary with changes in supply voltage anyhow. Since, however, according to Faraday's law of induction, the measurement voltage is always strictly proportional to the instantaneous value of the coil current, the dual-slope analog-to-digital converter relates the measurement voltage to a reference to which the measurement voltage is no longer proportional. This results in measurement errors and inaccuracies which, in turn, are proportional to the difference between the sampled value of the reference voltage and the instantaneous value of the coil current.

These interrelationships will now be explained in greater detail with the aid of FIG. 1, which is a timing diagram serving to explain the operation of prior art magnetoinductive flowmeters. In FIG. 1a, the voltage taken from the electrodes, hereinafter referred to as "measurement voltage $U_M$", is plotted against time t. The distance between the heavy crosslines on the time axis represents the period of a basic clock signal which is used as a time base and for synchronization in the electronic system.

In FIG. 1a, two different types of interference-voltage compensation are indicated one behind the other for simplicity. Each of them is used in a particular type of apparatus. One type, described in U.S. Pat. No. 4,210,022, is performed during period A of the basic clock signal. The other type, described in U.S. Pat. No. 4,704,908, is performed during the three periods B of the basic clock signal, with null detection taking place during the middle one of these three periods.

Figure 2:
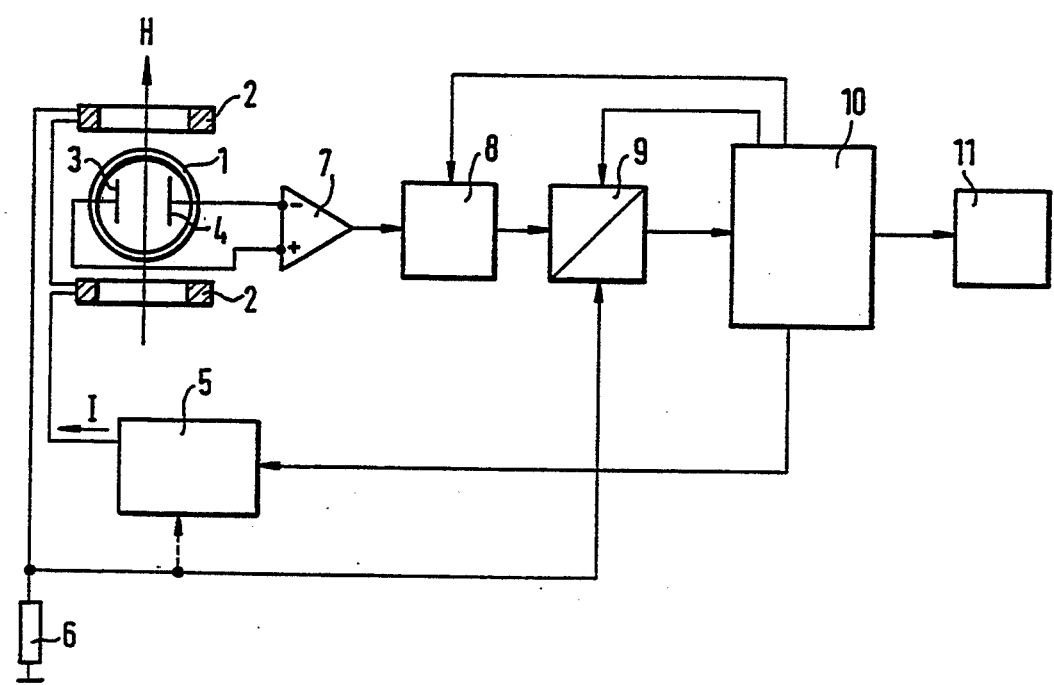

In FIG. 1a, the measurement voltage is shown alternately positive and negative since, as is generally the case in magnetoinductive flowmeters, the direction of the magnetic field is periodically reversed by coil-related polarity reversal of the coil current I (see FIG. 2).

Figure 1B:
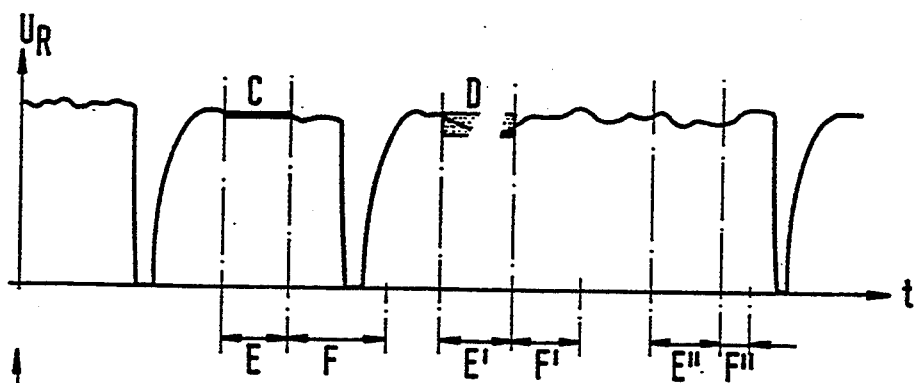

FIG. 1b shows the variation of the reference voltage $U_R$ with time, and hence the qualitative characteristic of the coil current I. It is shown positive for both directions of current, which applies for a so-called "H"-circuit, whose total current always flows in the same direction to ground through the measuring resistor.

Such an "H"-circuit is disclosed in the above-mentioned U.S. Pat. 4,210,022, FIG. 2, or in U.S. Pat. No. 4,410,926, FIG. 3. The "H"-circuit is a bridge with an electronic or mechanical switch in each of the four bridge arms and with the coil system in one of the bridge diagonals. To reverse the direction of current in the coil system, either only one pair of switches opposite this diagonal or the other pair is rendered conducting. The measuring resistor is located between one of the corner points of the other bridge diagonal and ground.

In the so-called "T"-circuit, shown in FIG. 4 of the above-mentioned U.S. Pat. No. 4,410,926, one end of the coil system is grounded through the measuring resistor and the other end is connected through an electronic or mechanical switch to the positive terminal of a DC voltage source and through another electronic or mechanical switch to the negative terminal of this DC voltage source. To reverse the direction of current in the coil system, either only one switch or the other is rendered conducting. Thus, unlike in the "H"-circuit, the current in the measuring resistor changes its direction. In a "T"-circuit, therefore, the reference voltage $U_R$ in FIG. 1b, like the measurement voltage $U_M$ in FIG. 1a, would be alternately positive and negative.

FIG. 1b shows that, because of the nonconstant coil current, the reference voltage is not horizontal but fluctuates. The respective waveform during the periods E of FIG. 1c is set off by rectangles at C and D.

Figure 1C:
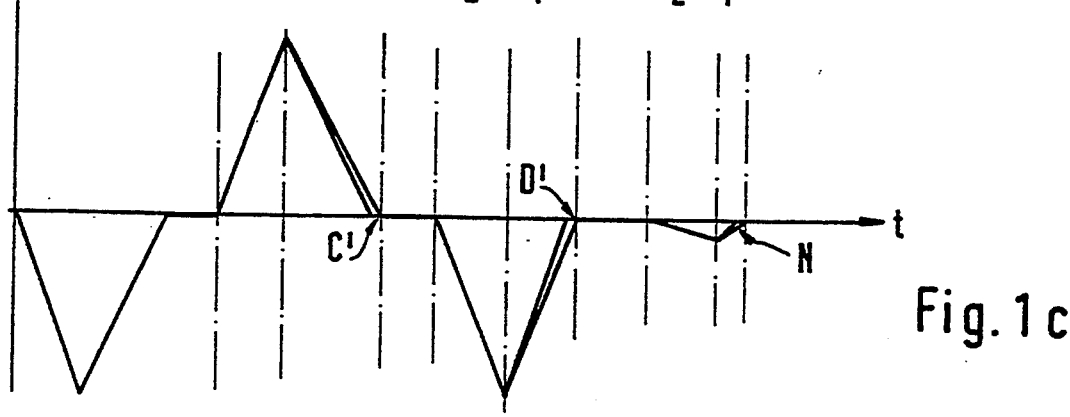

FIG. 1c shows in analog representation the up-integration by the dual-slope analog-to-digital converter, which takes place as a function of the measurement voltage during a predetermined time, namely a period E of the basic clock signal, and the subsequent down-integration using a predetermined, constant slope. The digital signal produced by the dual-slope analog-to-digital converter at the end of the down-integration is proportional to the down-integration time F, F', F''.

Thus, the nonconstant waveform of the measurement voltage and the choice of the reference-voltage value present at the beginning of the up-integration for the entire duration of the up- and down-integration result in measurement errors designated C' and D', respectively.

FIG. 1c further indicates that during the middle one of the three periods B of the basic clock signal, the dual-slope analog-to-digital converter also carries out a null detection as described in the above-mentioned U.S. Pat. No. 4,704,908. Here, too, a measurement error N is caused for the same reasons.

Figure 1D:
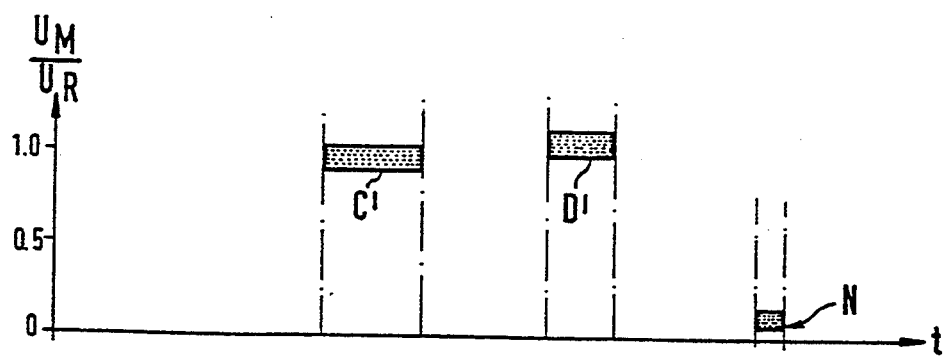

This measurement error is also apparent from FIG. 1d, which shows the quotient $U_M/U_R$ of the measurement voltage and the reference voltage. In the concrete case on which FIG. 1 is based, the respective upper values of the rectangles of FIG. 1d correspond to the correct measured values, while the respective lower values correspond to the erroneous values C', D', N of FIG. 1c.

Hence, the prior art type of dual-slope analog-to-digital conversion related to only one sample value of the reference voltage is insufficient, the more so since even if the coil current rises steeply—which, by the way, requires suitable circuitry—only a maximum of about 50% of the period of the measurement voltage can be covered.

To this must be added that in virtually all commercially available magnetoinductive flowmeters, compensation of the interference voltages appearing at the electrodes due to electrochemical processes is necessary, which is performed following the measurement period, as is described, for example, in U.S. Pat. No. 4,210,022 or U.S. Pat. No. 4,704,908. Together with a dual-slope analog-to-digital converter, this causes a prolongation of the measurement period and, thus, entails further disturbances, or two integrators must be provided, one for null detection and the other for detecting the measurement signal. The latter alternative requires quite a number of additional mechanical and/or electronic components.

It is, therefore, an object of the invention to implement the analog-to-digital conversion in another, more accurate manner. This is made possible by, inter alia, the claimed use of an analog-to-digital converter which continuously incorporates a reference voltage in the conversion. Therefore, the analog-to-digital conversion is strictly proportional to the instantaneous coil current. Preferably, such analog-to-digital converters are switched-capacitor or delta-sigma analog-to-digital converters.

Both types of analog-to-digital converters are described per se in the literature, cf. the journal "IEEE Journal of Solid-State Circuits", 1987, pages 157 to 163, and 1988, pages 736 to 741, for switched-capacitor analog-to-digital converters or the journal "IRE Trans. on Space Electronics and Telemetry", 1962, pages 204 to 209, for delta-sigma analog-to-digital converters. In the latter article, delta-sigma modulation is explained for the field of telemetry, i.e., for the transmission of measured values over a distance. In the more recent past, the special suitability of delta-sigma analog-to-digital converters for the digitization of audio signals in radio and television receivers was described, cf. the journal "Elektronik", 20 Sep., 1985, pages 75 to 77.

It is surprising and was not to be expected that, as the inventor discovered, the very-low-frequency electrode voltages of magnetoinductive flowmeters can be determined with very high accuracy by such analog-to-digital converters, which were described for other uses, particularly for telemetering or for audio signals.

An advantage of the invention is that even extremely unstable electrode voltages can be measured, since the sampling rate of the analog-to-digital converter can be chosen correspondingly high and since about 80% to 90% of the period of the measurement voltage can be covered.

The invention will become more apparent from the following description of an embodiment taken in conjunction with the other figures of the accompanying drawings, in which like parts are designated by like reference characters.

Figure 3:
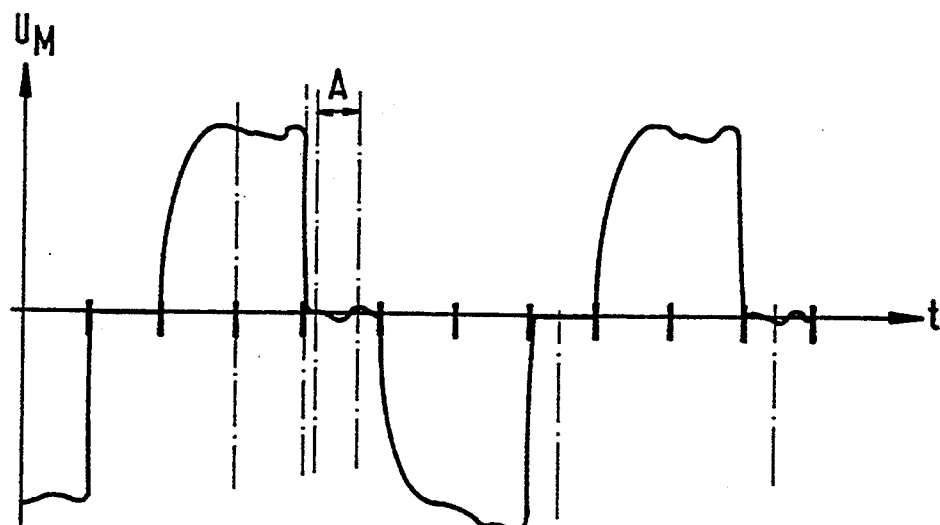
Figure 3:
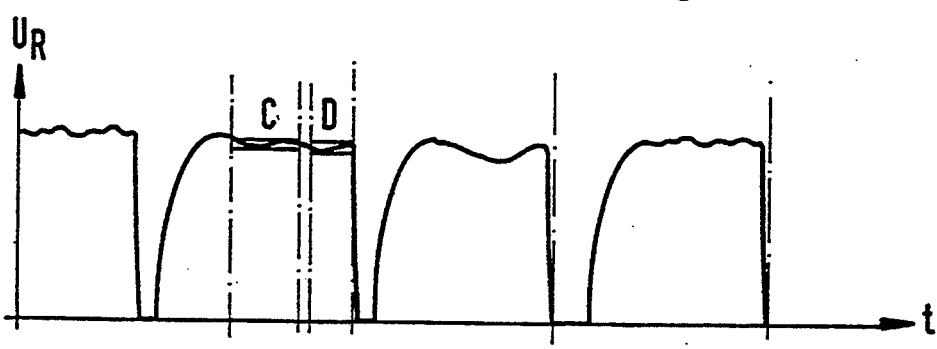
Figure 3:
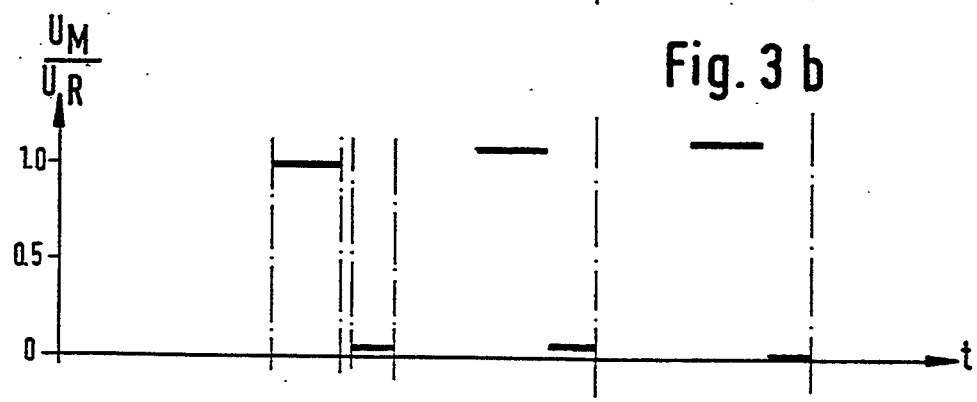

FIG. 2 shows schematically, in block-diagram form, the electronic portion of a magnetoinductive flowmeter, and FIG. 3 is a timing diagram which is analogous to that of FIG. 1 and serves to explain the operation of magnetoinductive flowmeters in accordance with the invention.

The block diagram of FIG. 2 includes a pipe 1 of a magnetoinductive flowmeter which is made either of a nonferromagnetic metal, such as stainless steel, and is insulated inside, e.g., by being coated with a plastic, such as polytetrafluorethylene, polyvinylidene fluoride or perfluoroalkoxy, or with soft or hard rubber. The pipe 1 may also be of an electrically nonconductive material, i.e., of an insulating material, such as ceramic, particularly $Al_2O_3$ ceramic. In operation, an electrically conductive liquid, whose volume rate of flow is to be measured, flows through the pipe 1 in a direction perpendicular to the plane of the paper.

A coil system 2, consisting in FIG. 2 of two electrically series-connected coils located above and below the pipe, respectively, produce a magnetic field H perpendicular to the longitudinal axis of, and cutting, the pipe 1 when a current I flows in the coil system 2. The intensity and direction of this current are determined by a control circuit 5. The current I also flows through a measuring resistor 6, which has one end grounded. Hence, the current I produces a reference voltage $U_R$ across this resistor.

Galvanic or capacitive electrodes 3, 4 are mounted opposite each other in the wall of the pipe. Galvanic electrodes are in contact with the liquid, whereas capacitive ones are not. The line joining the electrodes is perpendicular to the pipe axis and to the direction of the magnetic field. According to Faraday's law of induction, a voltage, the measurement voltage $U_M$, appears between the electrodes 3, 4 which is proportional to the volume rate of flow. In most cases, an interference voltage is superimposed on the measurement voltage; it is caused by varying electrochemical equilibrium potentials and may, in the course of time, reach values which are a multiple of the measurement voltage.

A control circuit 5 controls the coil current I in accordance with a signal from a microprocessor 10, such that, inter alia, the current direction is periodically reversed with respect to the basic clock signal, as shown in FIG. 1. If current regulation is provided, the reference voltage $U_R$ is also applied to the control circuit 5; this is indicated in FIG. 2 by the dashed line.

Each of the electrodes 3, 4 is connected to one of the inputs of a differential amplifier 7, which needs to have only a low gain, so that it cannot be overloaded even by large interference voltages. The output of the differential amplifier 7 is coupled to one input of a summer 8 whose other input is supplied with a compensation signal from the microprocessor 10 in a manner known per se, cf. the above-mentioned U.S. Pat. Nos. 4,210,022 and 4,704,908.

The output of the summer 8 is coupled to the signal input of an analog-to-digital converter 9 which continuously incorporates a reference voltage, i.e., the respective instantaneous value of this reference voltage, in the conversion. To this end, the voltage across the measuring resistor 6 is applied as this reference voltage $U_R$ to the analog-to-digital converter. The clock signal necessary for the analog-to-digital conversion is applied to the analog-to-digital converter 9 from the microprocessor 10.

The microprocessor 10 includes a sequencer for controlling the turning on and off of the current-direction-reversing switches in the control circuit 5 and for timing the analog-to-digital converter 9 and any further subcircuits that may be necessary. The microprocessor 10 further derives from the digitized output of the summer 8 a signal which is representative of the measured volume rate of flow and is fed to a display unit 11.

FIG. 3 is a timing diagram which is analogous to that of FIG. 1 and serves to explain the operation of magnetoinductive flowmeters in accordance with the invention. FIGS. 3a and 3b correspond to FIGS. 1a and 1b and, hence, need not be explained again. However, the compensation phase B of FIG. 1a has been omitted, so that the prolonged measurement period of FIG. 1a need not be used. Further, there is no figure corresponding to FIG. 1c, so that FIG. 3c corresponds to FIG. 1d.

FIGS. 3a and 3b again show the coil-current fluctuations during the measurement periods C, D and the resulting proportional fluctuations of the measurement voltage. FIG. 3e now shows that the quotient $U_M/U_R$ no longer contains an error but represents the exact measured value.

I claim:

1. A magnetoinductive flowmeter comprising
   an insulated nonferromagnetic metal conduit,
   a coil system for producing a magnetic field whose direction is generally perpendicular to the axis of the pipe and which cuts the pipe,
   a control circuit for controlling a current flowing through the coil system and a measuring resistor,
   two electrodes which are mounted opposite each other in the wall of the pipe and whose connecting line is generally perpendicular to the pipe axis and to the direction of the magnetic field, and
   a measuring circuit having its input connected to the electrodes and containing, between its input and its output, the following subcircuits electrically connected in the order given:
   a differential amplifier connected to the electrodes,
   a summer,
   an analog-to-digital converter which continuously incorporates a variable reference voltage in the conversion and to which the voltage across the measuring resistor is applied as said reference voltage to compensate for variations in the current flowing through the coil system,
   a microprocessor generating a compensation signal for the summer and including a sequencer, and
   a display unit.

2. A magnetoinductive flowmeter as claimed in claim 1 and comprising a switched-capacitor analog-to-digital converter.

3. A magnetoinductive flowmeter as claimed in claim 1 and comprising a delta-sigma analog-to-digital converter.

4. A magnetoinductive flowmeter comprising:
   a pipe having a non-conductive interior surface;
   a coil system for producing a magnetic field directed generally perpendicular to a longitudinal axis of the pipe;
   a measuring resistor;
   a control circuit for controlling a current flow through the coil system and through the measuring resistor so that the measuring resistor generates a variable reference voltage proportional to the current flow through the coil system;
   first and second electrodes coupled to opposite sides of the pipe; and
   means coupled to the first and second electrodes for generating an output signal proportional to the flow rate of a liquid through the pipe, the generating means including an analog-to-digital converter which continuously incorporates the variable reference voltage from the measuring resistor during a conversion period of the analog-to-digital converter to compensate for fluctuations in the current which occur during said conversion period, thereby increasing the accuracy of the output signal.

5. A magnetoinductive flowmeter of claim 4, wherein the generating means includes a differential amplifier having first and second inputs coupled to the first and second electrodes, respectively.

6. A magnetoinductive flowmeter of claim 5, wherein the generating means further includes a summer having a first input coupled to an output of the differential amplifier, a second input coupled to a compensation signal generator, and an output coupled to the analog-to-digital converter.

7. A magnetoinductive flowmeter of claim 4, wherein the analog-to-digital converter is a delta-sigma analog-to-digital converter.

8. A magnetoinductive flowmeter of claim 4, wherein the analog-to-digital converter is a switched-capacitor analog-to-digital converter.

9. A magnetoinductive flowmeter of claim 4, wherein the generating means includes a microprocessor for controlling the control circuit.

10. A magnetoinductive flowmeter of claim 9, wherein the microprocessor includes a sequencer for timing the analog-to-digital converter.

11. A magnetoinductive flowmeter of claim 4, further comprising a display unit coupled to the generating means.

12. A magnetoinductive flowmeter comprising:
    a pipe having a non-conductive interior surface;

a coil system for producing a magnetic field directed generally perpendicular to a longitudinal axis of the pipe;

a measuring resistor;

a control circuit for controlling a current flow through the coil system and through the measuring resistor so that the measuring resistor generates a variable reference voltage proportional to the current flow through the coil system;

first and second electrodes coupled to opposite sides of the pipe; and means coupled to the first and second electrodes for generating an output signal proportional to the flow rate of a liquid through the pipe, the generating means including means for continuously incorporating the variable reference voltage to compensate for fluctuations in the current flow through the coil system, thereby improving the accuracy of the output signal.

13. A magnetoinductive flowmeter of claim 12, wherein the analog-to-digital converter is a delta-sigma analog-to-digital converter.

14. A magnetoinductive flowmeter of claim 12, wherein the analog-to-digital converter is a switched-capacitor analog-to-digital converter.

15. A magnetoinductive flowmeter of claim 12, wherein the generating means includes a microprocessor having a sequencer for timing the analog-to-digital converter.

16. A magnetoinductive flowmeter of claim 12, further comprising a display unit coupled to the generating means.

* * * * *